Dec. 24, 1940.  R. E. PECK  2,226,523
CONDUIT CONSTRUCTION
Filed Jan. 6, 1940
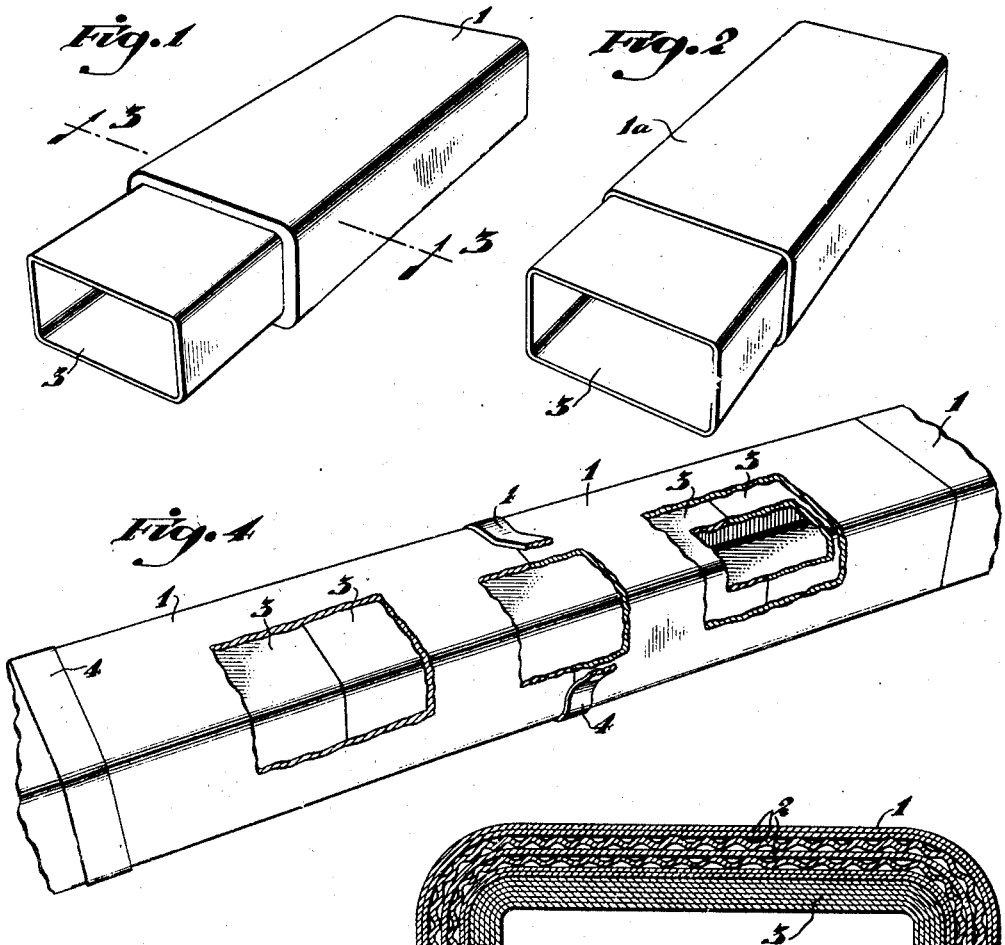
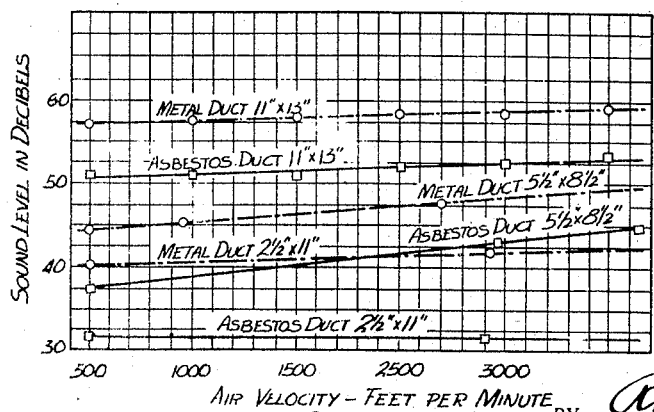
INVENTOR.
Robert E. Peck
BY Wood & Wood ATTORNEYS Patented Dec. 24, 1940

2,226,523

UNITED STATES PATENT OFFICE 2,226,523

CONDUIT CONSTRUCTION

Robert E. Peck, Cincinnati, Ohio, assignor of one-fourth to Wm. Burchenal, and one-fourth to Morss Lippincott, both of Cincinnati, Ohio Application January 6, 1940, Serial No. 312,707

6 Claims. (Cl. 138—62)

This invention relates to ducts and conduits of the type used for conveying air in heating, ventilating, and air conditioning systems. The invention is directed particularly to a new type of duct and to the art of making it.

It has been the object of the invention to provide ducts or conduits which are peculiarly suited to present day construction practices. It has also been the object to provide ducts or conduits which are substantially less expensive than those now available. The accomplishment of these and other objectives is described in detail in the following specification. However, in order fully to appreciate the nature of the present advance, a brief explanation of the conventional practices which heretofore have been employed is requisite.

In the past, duct work and air conduit have been made of sheet metal by skilled sheet metal workers or tinsmiths. The various pieces of conduit are made in the local shops and, later, the unitary pieces of duct for the straight-run sections, and the various elbows and fittings, are taken to the job and there installed. An appreciable amount of time and a high degree of skill is required in the fashioning, bending, and configurating of the metal, and substantial wages are commanded by those engaged in the work. In substance, the technique of making duct and installing it has been rather highly specialized and, therefore, the cost to the building owner is appreciable.

On the other hand, while the metal of which the duct is made is strong tensionally, it is very flexible laterally and the duct, once installed, exhibits the tendency to amplify rumbling sounds which are created either by the passage of air through the duct, or the vibration of the duct from external causes, or both. In order to dampen such vibrations, and in order to prevent heat transfer, if the duct be in a heating or cooling system, it has been the conventional practice to wrap the duct with insulation material such as sheet asbestos or the like. The insulating of the duct is done after it has been installed within the building, and this operation likewise is performed by relatively skilled workmen, as each sheet of insulation must be cut, fitted and pasted in its appropriate place. All of these operations make the expense of installing the conduit of a given system almost as great, and in some instances even greater than the cost of the heating, ventilating, or air conditioning equipment.

While some notable improvements have been made in the apparatus for heating and cooling air, and in grilles for diffusing conditioned air, the use of sheet metal duct for conveying the air has continued for lack of a more satisfactory, and less expensive, solution to the various problems which heretofore have been involved.

Briefly, the present invention, in contrast with these specialized practices of the past, is predicated upon the concept of providing unitary lengths of duct or conduit, each made of layers or laminations of fibrous insulating material; for instance asbestos sheet, or asbestos paper, wound upon itself. Each of these unitary lengths of duct is comprised of an outer section and an inner section which are telescopically slidable relative to one another.

The wall members constituting an inner section, or core, are solid and firm; these sections collectively form the "backbone" of the duct. The wall members of the outer section, in the preferred structure are formed of asbestos paper which has been crimped or corrugated so that multiple layers of dead air cells are provided. These outer sections collectively provide an insulating shell or jacket. Both sections are made in substantially the same way; that is, by wrapping layers or laminations of sheet asbestos, or the like, about mandrels of appropriate size.

In the preferred structures, the lengths of duct work are rectangular in cross section and it is recommended that the layers or laminations forming the interior and exterior sections of each length be adhesively united together. For this purpose, suitable silicate glue or adhesive, or a similar material, is applied to the sheet material as it is being wound upon itself over the mandrel. Subsequent to the forming operation, it is desirable to dry the product so as to remove the moisture and set the glue.

The next feature of the present advance, and one which is of utmost practical value, is predicated upon the utilization of a characteristic of asbestos which never heretofore has been fully appreciated. The surface of asbestos is quite rough and somewhat gritty, and it displays many of the characteristics of a typical abrasive. But this surface also is somewhat distintegrable and the fibers of asbestos tend to come loosened when two asbestos paper surfaces are rubbed together or moved past one another. The loosened fibers tend to be rolled upon themselves and accumulate as spherical conglomerations; these, in turn, reduce the friction between the adjacent surfaces and, paradoxically make the sliding together of the relatively rough surfaces of the mating sections of simple and easy operation. By virtue of this characteristic, the external dimensions of the inner duct can approximate very closely the internal dimensions of the outer section, and the two sections, when in telescoping relationship, be thereby made to fit together snugly for preventing the seepage of air between adjoining wall members, and for structural reinforcement of one member by the other.

Thus, the lengths of duct of the present invention are assembled by the telescopic sliding together of an outer section of one length and an inner section of an adjoining length to such extent that the joints between abutting core members and abutting jacket sections fall substantially midway one another. The fashioning of elbows and fittings is described at a later point in the specification.

To suit engineering and capacity requirements, the ducts must necessarily be of various sizes, for example, from about 2½" x 5½" cross sectionally, to 24" x 24" or larger. In the construction of the smaller sizes it is requisite that the inner and outer sections fit together snugly lest too great a loss of air take place by seepage between the sections. Ducts of the larger sizes are obviously cumbersome to handle and, while there is greater surface to surface area in these sizes for prevention of air seepage, here too the fit between the inner and outer sections is quite important because of the structural stability which the staggered sections may lend to one another. Large or small, the ease with which the sections of the present invention may be assembled, which is brought about through the peculiar reduction of friction by the sliding asbestos surfaces, makes possible the maintenance of the snug fits which are requisite. Were the lengths to be made of materials other than the fibrous asbestos, they would bind together firmly and be impossible to handle or assemble, or special presses would be required. If the clearance tolerances were enlarged then the sections would tend to cant within one another and make the assembly still more difficult. The difficulties would become even more pronounced as the size or capacity of the duct were increased.

In the preferred practice of the invention, the unitary sections are approximately 3 or 4 feet in length, more or less, so as to interconnected 1½ or 2 feet. Such sections, nested together, one completely within the other, are delivered to the construction job where they are to be installed; thereafter the workmen telescope the sections and assemble them together.

Since the fibrous material exerts a dampening or deadening action upon sound, the velocity of the air or gaseous fluids passing through the duct may be increased substantially without danger of causing vibrations or rumbling noises. Therefore, the cross sectional area, or the size of the duct, can be decreased with disregard to the increase in velocity which will be brought about. In other words, ducts of a smaller size can be utilized to handle a given volume of air per given unit of time. The sound dampening feature also is important in preventing the transmission of sounds from one part of a building to another.

An appreciable part of any installation is the preparation of the special fittings, turns, and elbows which are required for "running" the duct to the various outlets. Asbestos may be sawed easily and conveniently by means of an ordinary saw, therefore a workman who requires a length only 2' long to make a given joint simply scribes a pencil line around a standard length of duct and saws it off and fits it into place, in conjunction with the mating member cut to accommodate the staggering of the joints.

Further features and advantages of the invention are disclosed in the detailed specification of the conduit which follows, and in the drawing which illustrates a typical embodiment of the preferred structure.

In the drawing:

Figure 1 is a perspective view of a section of conduit material having the inner core partially removed.

Figure 2 is a perspective view of a section of conduit material having a thinner outer shell than that shown in Figure 1.

Figure 3 is a sectional view of the assembly shown in Figure 1, taken along the lines 3—3.

Figure 4 is a perspective view of an assembled conduit illustrating the preferred broken or staggered joint construction with portions cut away to show the internal structure.

Figure 5 is a graph showing the sound deadening qualities of my duct material as compared to metal ducts.

The outer shell 1 is of rectangular shape. The walls of this section preferably are formed of laminations of corrugated or indented asbestos sheet material 2, cemented together into self-sustaining condition by means of an adhesive preferably composed of a siliceous compound treated so as to render the coating moisture resistant, for instance, a self-hardening silicate cement. Figure 1 shows the outer shell 1 of substantially one inch thickness, while Figure 2 shows the outer shell 1a of about one-half inch thickness.

The inner core 3 is also of rectangular shape and is composed of asbestos material formed into a solid, firm structure. The outer dimensions of the core are such as to make a close sliding fit within the outer shell. The dimensions of the inner and outer sections, as previously described, are such that the two fit together snugly. The asbestos surfaces of the meeting sections exert their peculiar characteristics to lessen the friction and make the sliding together of the sections easy and convenient. It is recommended that the plies of the asbestos sheet material of which the inner core member 3 is made be treated with water-proofing compound so that the inner core sections will not be subject to deterioration or loss of tensile strength after exposure to moisture containing air passing through the conduit.

Figure 4 shows a preferred method of assembling or erecting the outer shells and cores into a finished conduit.

If desired, the conduit may be supported by bands placed at intervals of approximately five feet. It is recommended that the inner core of each section be made to project approximately half way into the insulating shell of the adjacent section so as to give staggered joint construction and prevent air leakage. The joints of the outer shell sections should be tightly taped with flexible tape such as is indicated at 4. This tape may be of cloth or metal; since the outer shells are supported by the inner cores, the principal requirement of the tape is that it prevent leakage of gases or air at the joints.

The end edges of both the outer shells and inner core members are preferably saw cut so as to be substantially smooth. This permits tight fitting joints to be obtained. In the application of the tape an excess of adhesive may be applied which seeps into the joints between edges of the outer shell sections and in effect thus forms a continuous outer shell with the joints bonded together with adhesive.

For the manufacture of L's of, say, 90° duct sections are mitred and then fastened together as shown and described in my copending application Serial No. 308,591. T's are made by combining an L with a straight section of duct. In each instance the core members are extended from the fitting to engage the conduit it is to join. In this manner the continuity of the inner core "backbone" is maintained.

In shipping the sections there is great economy of space by having an inner core section nested within an outer shell section.

Engineering data on the relative desirable physical characteristics of my new conduit material have shown a decided improvement in substantially every quality which conduit construction should possess.

Aside from the features and advantages which follow, the invention contemplates the manufacture of duct of rectangular shape, with the dimensions being adjusted so that two or more ducts of smaller size will fit and conform to a duct of larger size; for instance, so a duct of, say, 11½ inches by 11½ inches may be joined with two 2½" x 11½" ducts and one 5½" x 11½" duct. This arrangement simplifies the making of branch connections and fittings.

Friction losses

The smooth inner surfaces of the conduits and the absence of irregularities at the joints of sections combine to keep friction losses to a minimum. Extensive tests of straight sections of conduits and galvanized metal duct show no appreciable differences.

Sound deadening

Perhaps the severest handicap in the use of air conditioning systems, particularly in residences, is the element of noise transmission. Mechanical fan noises, the operation of dampers, air whistle, duct vibration, and the transmission of external noises through the duct walls have all led to disagreeable effects. From the viewpoint of noise, metal is the least desirable material for duct construction. Sound tests under the auspices of the Mellon Institute of the University of Pittsburgh show that my conduit material offers a tremendous improvement in reducing sound in duct systems. External sounds are muffled by the thick duct walls. The metallic "oil can" cracking due to changes in air pressure in the duct or to expansion strains is completely eliminated. Mechanical fan noises, particularly those of high frequency, are noticeably reduced. Duct pulsation or "breathing" noises are eliminated. There is no air "whistle" even with velocities as high as 3500 lineal feet per minute. Asbestos duct vanes in fittings obviate any metallic rattle, and effect a partial acoustical treatment.

The graph, Sound level drop curves comparing my conduit material with metal duct, shows conclusively that the new conduit construction substantially reduces the noise commonly found in duct systems. It may be noted that as the ducts become smaller the sound intensity becomes much less. Also, it can clearly be seen that increasing velocities have little effect on increasing noise. The use of smaller ducts and higher velocities is very desirable.

In the curves illustrated in Figure 5 the sound level at the discharge end of the system is plotted against the velocity of air passing through the duct. The length of the system illustrated is 76 feet and the sound level at the entrance to the duct is 90 decibels.

Economy

With all its other advantages and improved performances over metal ducts, the conduit may be erected at a much lower cost than properly insulated and well constructed metal ducts of the same size. Add to this the fact that systems constructed with my improved duct material can be materially reduced in size often to one half (minimum air velocity 1000 feet per minute), and a very substantial saving can be made in both cost and in space.

Heat transmission characteristics

Tests were conducted on various sizes of one-half inch thick asbestos ducts and on tarnished metal ducts of the same internal dimensions and it was found that the thermal transmission coefficients for metal were 1.11 B. t. u. per hour per square foot per degree Fahrenheit as compared with 0.668 B. t. u. per hour per square foot for my conduit, using the A. S. H. V. E. Guide 1937 (page 176) formula for calculating the temperature drop in ducts.

This application is a continuation in part of my application Serial No. 206,770, being confined to the conduit material itself as made, and to the conduit installation after its erection.

Having described my invention, I claim:

1. A length of material for building an air duct comprising telescopically slidable tubular sections, one fitting snugly within the other and arranged for assembly in staggered relation with similar sections to form a conduit, the walls constituting one of the sections being comprised of laminations of asbestos containing sheet material and being solid and firm to form a backbone core, and the walls of the other of the sections being comprised of laminations of asbestos containing sheet material having indentations providing air cells intermediate the laminations.

2. A length of material for building an air duct comprising tubular sections fitting snugly one within the other, the one section being comprised of integral walls formed of laminations of asbestos containing sheet material and being solid and firm to provide a core of substantial structural rigidity, and the other section being comprised of integral walls formed of laminations of asbestos containing sheet material having indentations providing air cells intermediate the laminations, the inner section being slidable telescopically with respect to the other section by virtue of accumulations of asbestos intermediate the inner section and the outer section.

3. An air duct comprising an assembly of tubular sections, each comprised of an inner member and an outer member staggered in relation to one another and connecting, in telescoping relationship, with complementary members of adjoining sections, the one member of each section being comprised of integral walls formed of laminations of asbestos paper having indentations providing air cells intermediate the laminations, and the other member of each section being comprised of integral walls formed of laminations of asbestos paper and being solid and firm to provide a backbone core for the air duct formed of the sections.

4. A length of material for building an air duct comprising tubular sections fitting snugly one within the other and having their ends in flush relationship for compaction during shipment, the inner section being comprised of integral walls formed of laminations of asbestos containing sheets and being solid and firm to provide a core of substantial structural rigidity, and the outer section being comprised of integral walls formed of laminations of asbestos containing sheets having indentations providing air cells intermediate the sheets, the inner section being slidable telescopically with respect to the outer section by virtue of accumulations of fibers of asbestos intermediate the sections.

5. A length of material for building an air duct comprising telescopically slidable tubular sections arranged one within the other for assembly in staggered relation with similar sections to form a conduit, the tubular sections being made of asbestos-containing material with the mating faces of at least one of the sections being comprised of asbestos fibers which become loosened when the sections are slid together, and with the sections being dimensioned to fit together snugly to provide a substantially air-tight joint therebetween.

6. A length of material for building an air duct comprising telescopically slidable tubular sections one fitting snugly within the other and arranged for assembly in staggered relation with similar sections to form a conduit, the walls constituting one of the sections being comprised of asbestos-containing material and being solid and firm to form a back-bone, and the walls of the other of the sections being comprised of asbestos-containing material and being configurated to provide air-cells therein.

ROBERT E. PECK.